Patented Mar. 14, 1944

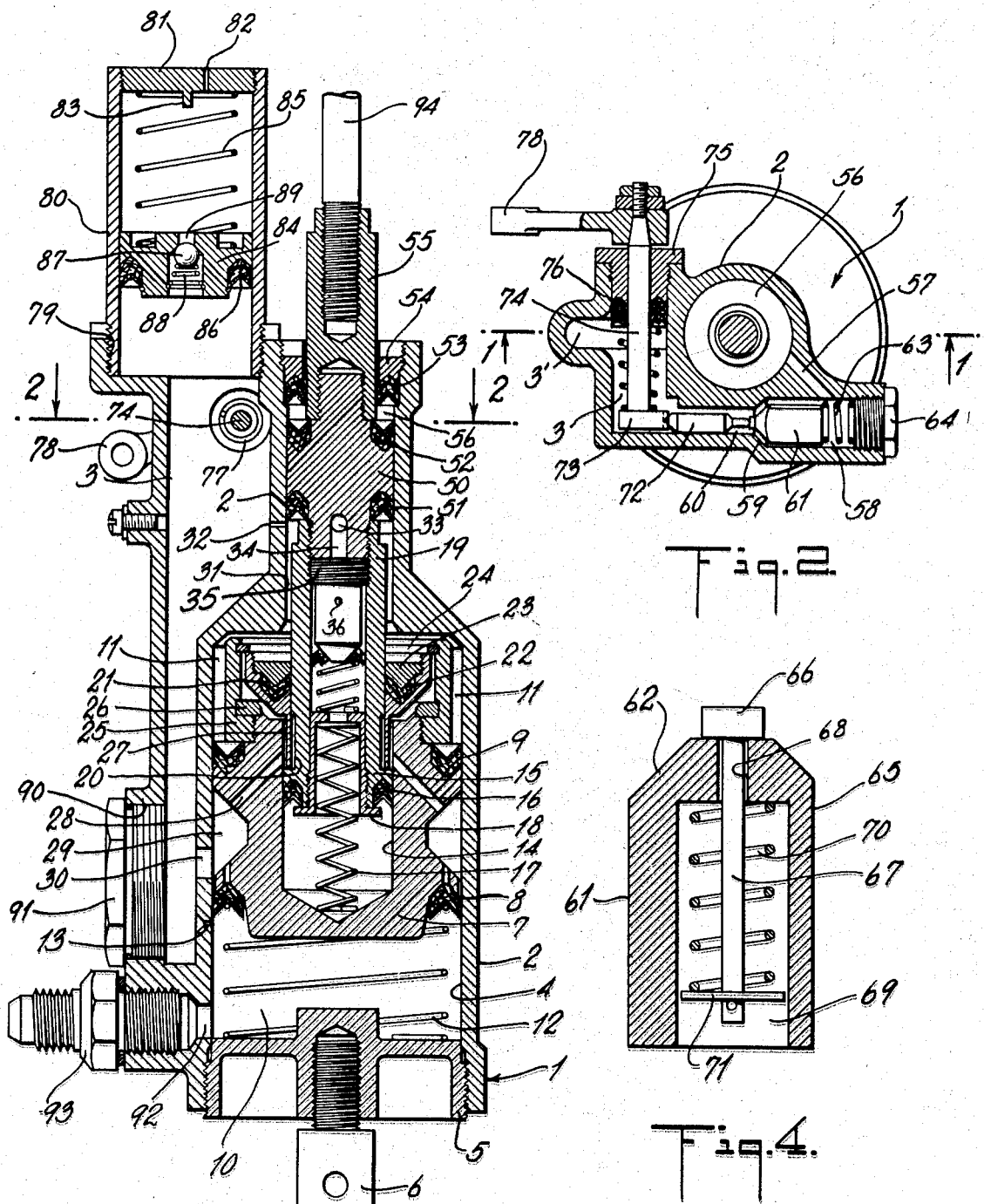

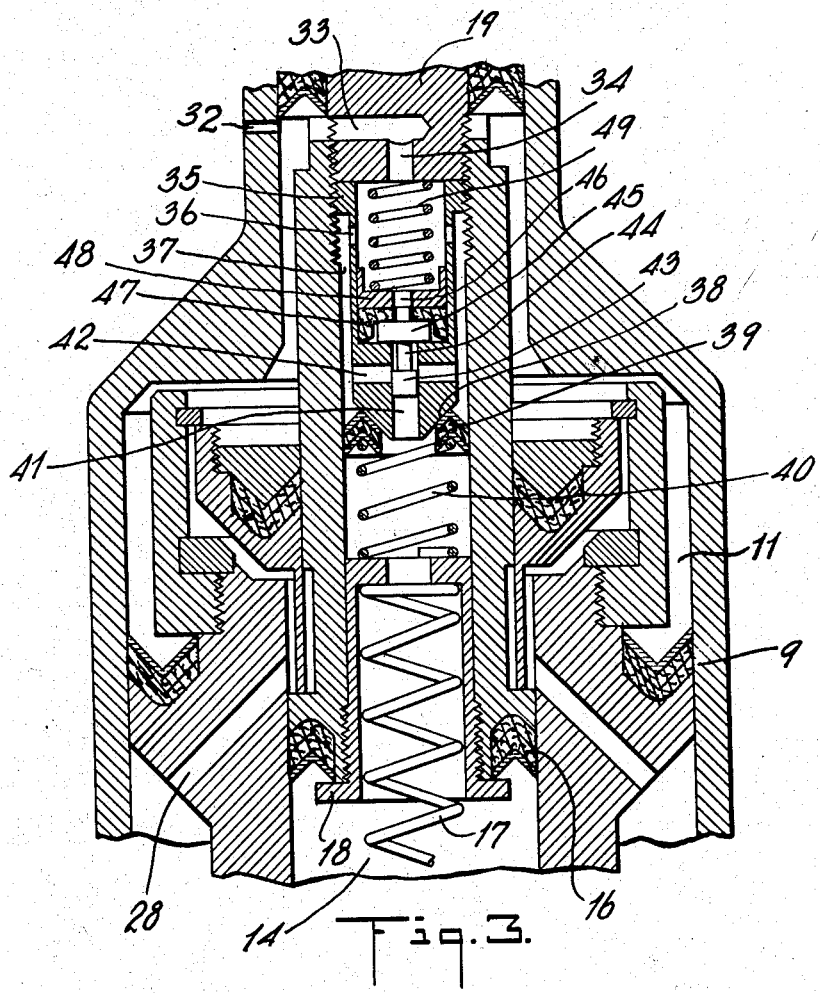

2,344,299

UNITED STATES PATENT OFFICE 2,344,299

HYDRAULIC ACTUATING MECHANISM

Martin V. Groves, Brooklyn, N. Y., assignor of one-half to Arthur Wilde and Arthur Hull-Ryde, both of Bayside, N. Y.

Application March 28, 1942, Serial No. 436,584

3 Claims. (Cl. 60—54.6)

This invention relates to hydraulic actuating mechanism where liquid pressure is used as the motive medium. The invention is especially useful where in addition to actuation it may be desired to maintain the parts in a relatively fixed position after actuation; also where, as in airplanes, the mechanism is subjected to frequent change in position, or to substantial variation in temperature. Since an airplane hydraulic braking system presents all of the difficulties which are overcome by the invention, an embodiment of the invention which has proven of great advantage in such a use will be described herein as exemplifyig the various features and advantages of the invention.

Certain features described but not claimed herein from the subject matter of my copending application Serial No. 366,333, filed November 20, 1940, for Compound hydraulic brake pump.

An object of the invention is to provide a mechanism of the character mentioned which is maintained free of air pockets.

Another object of the invention is to provide such mechanism which may be readily and conveniently locked in position with power applied.

Another object of the invention is to provide such mechanism which will not be detrimentally affected by substantial changes in temperature, or position.

A further object of the invention is to provide a compressor unit adapted for use either in a horizontal or vertical position.

Further objects and advantages of the invention will more fully appear from the following description taken in connection with the accompanying drawings which show, by way of example the present preferred embodiment of the invention.

The invention consists of the novel feature, arrangement, and combination of parts embodied by way of example in the mechanism hereinafter described as illustrating the present preferred form of the invention, and the invention will be more particularly pointed out in the appended claims.

Referring to the drawings, in which the same reference characters indicate the same parts in the various views:

Fig. 1 is a longitudinal sectional view through a liquid compressor unit made in accordance with the invention and taken as indicated at 1—1 of Fig. 2;

Fig. 2 is a transverse section through the said compressor unit taken as indicated at 2—2 of Fig. 1;

Fig. 3 is an enlarged sectional view showing further details of certain parts of the mechanism illustrated in Fig. 1;

Fig. 4 is a sectional view showing further details of the structure illustrated in Fig. 2; and Fig. 5 is a diagrammatic sketch of a hydraulic pressure actuating system illustrating the present invention as embodied in an airplane and serving to control the brakes.

Referring to Fig. 1 of the drawings; the motor unit in its entirety is designated 1 and comprises a main body member 2, (which in the present embodiment is in the form of a casting) providing a liquid reservoir 3 and a pressure cylinder 4 provided with a cylinder head 5, which in the present embodiment is held in sealed engagement within the body 2 by cooperating screw-threaded engagement therewith. An eye-screw 6 is secured to the head 5 and provides a suitable means of attachment for the compressor unit. A piston 7 is provided with a suitable front sealing ring 8 and a rear sealing ring 9 in liquid sealing engagement with the cylinder 4. In the present embodiment a compound piston is employed, and the piston 7 is the low-pressure piston and the cylinder 4 is the low-pressure cylinder. The piston 7 divides the cylinder 4 in a forward chamber 10 and a rear chamber 11 and is held in retracted position by means of a helical compression spring 12. When the piston 7 is in retracted position the chamber 10 is in communication with the reservoir 3 through a passageway 13.

The piston 7 is provided with an interior bore 14 serving as a high pressure cylinder and in which a high pressure piston 15 is positioned, provided with a suitable sealing ring 16 in liquid-tight engagement with the cylinder 14. The high pressure piston 15 is held in retracted position by means of a helical compression spring 17 having its forward end seated within the cylinder bore 14 and its rearward end seated within a cup 18 in threaded engagement with an interior bore provided in the piston 15 and extending rearwardly into an axial bore provided in a piston rod 19. The piston rod 19 is reduced in diameter at the rear of the piston 15 and is preferably provided with a horizontal portion 20 for engagement by a wrench in assembling operation. A valve member 21 surrounds the piston rod 19 and is provided with a forwardly extending sleeve portion seated against the rear face of the piston 15, surrounding the hexagonal portion 20 and having outside diameter smaller than the cylinder bore 14. The valve member 21 is provided with a sealing ring 22 secured therein by means of a ring 23 so as to provide a liquid seal permitting relative movement between the valve member 21 and piston rod 19. The valve member 21 is held inwardly in position by means of a lock ring 24 which is carried by a sleeve 25 secured to the rear end of the piston 7 and serving also to carry a valve seat 26 for cooperative engagement with the valve member 21. When the valve member 21 is in open position, as illustrated in Fig. 1, the rear chamber 11 is in communication through this valve with an annular space 27 which in turn is in communication through passages such as 28 with an annular piston groove 29 which is in communication with the reservoir 3 through a port 30. A reduced bore 31 is of slightly greater diameter than the piston rod 19 and provides a rearward extension of the rear chamber 11, and the bore 31 is provided with a port 32 serving to place the rear chamber 11 in communication with the reservoir 3.

The rear chamber 11 is also in communication with a radial passage 33 which (Fig. 3) extends inwardly from the bore 31 to an axial bore 34 provided within the piston rod 19; and the bore 34 communicates with the interior bore of a valve body 35 which is provided with radially extending passages 36 in communication with an annular space 37 provided between the outer diameter of the member 35 and the bore provided in the piston rod 19. The inner end of the valve member 35 is provided with a valve portion 38 adapted to be seated on a suitable valve sealing seat 39 which is urged toward engagement by means of a helical compression spring 40 seated against the rear face of the cup 18. The spring 40 is preferably relatively weaker than the high pressure spring 17. The valve members 38—39 thus provide a valve which is closed during actuation of the piston means but is opened upon retraction of the piston means to permit passage of liquid therethrough. The valve member 35 also comprises a loaded valve which will now be described. The inner end of the member 35 is provided with an axial bore 41 the forward end of which is in communication with the bore extending forwardly of piston rod 19 and this in turn is in communication with the high pressure cylinder bore 14 through a hole provided in the bottom of the cup 18. The bore 41 is provided with outwardly radially extending ports 42 serving to place the same in communication with the annular space 37. A valve plunger 43 is slidably positioned within the bore 41 and is rigidly attached to a reduced stem 44, to the other end of which is attached a head 45 which is positioned in the bore of the member 35 and adapted to be seated over the rear end of the bore 41. A rubber cup 47 is inverted over the head 45 with its forward flange adapted to rest against the forward end of the bore provided in the member 35 and is provided with a central opening; and a corresponding opening is provided in a reversely disposed metal cup 48 slidingly disposed in the bore of member 35 and normally held forwardly by means of a compression spring 49.

*Locking mechanism*

The piston rod 19 (Fig. 1) is provided with a head 50 which carries on its forward face a sealing ring 51 in sealing engagement within the bore 31 and in the retracted position of the piston adapted to lie to the rear of the opening 32, which will be closed by said ring 51 upon the forward movement of the piston. The rear face of the head 50 carries a sealing ring 52, also in liquid sealing engagement with the bore 31. A relatively fixed sealing ring 53 is secured within the bore 31 by suitable means such as the threaded ring 54 so as to hold the sealing ring 53 in sealing engagement around the piston rod extension 55. The sealing rings 52—53 provide therebetween a locking chamber 56 within the bore 31 and this chamber is normally in communication with the reservoir 3 in the manner to be now more particularly described with reference to Fig. 2.

The chamber 56 is provided with a passage 57 which extends outwardly and at its lower end is in communication with a valve opening 58 provided with a valve seat 59; the valve opening 58 is in communication with a bore 60 which opens into the reservoir 3. A valve plunger 61 is positioned within the opening 58 and is provided with a conical valve surface 62 cooperatively disposed to be seated in sealing engagement on the seat 59, toward which it is urged by means of a compression spring 63 held in position by means of a screw plug 64. The valve plunger 61 is provided with suitable flattened portions such as 65 to provide a suitable passage for the flow of liquid when the valve is opened. The valve plunger 61 is preferably provided with relief valve mechanism comprising a head 66 seated on the forward face of the plunger 61 and having an integrally formed stem 67 passing through a somewhat larger hole 68, and rearwardly through an enlarged bore 69; the valve 66 being urged against its seat by means of a compression spring 70 positioned within the bore 69, surrounding the stem 67 and restrained between the bottom of the bore 69 and the outer end of the stem 67 by suitable means such as a washer and pin 71. A plunger pin 72 is disposed within the passage 60 with its inner end directed toward the valve plunger 61 and its outer pointed head directed toward an eccentric or cam 73: in the position of the parts shown the plunger resting in a detent groove in the high side of the cam and the other end of the pin resting against the inner end of the valve plunger 61 holding it away from its seat 59 against the compression spring 63. The cam 73 is carried by a shaft 74 which is suitably journalled in a bushing nut 75 secured to the main body portion 2 and provided on its inner face with a suitable liquid seal or gasket 76 which is held in position by means of the compression spring 77 which serves the additional purpose of centering the cam and shaft in position. The outwardly extending end of the cam shaft 74 is provided with an operating lever 78.

Referring particularly to Fig. 1; the upper end of the reservoir adjacent the piston rod end of the compressor is provided with a threaded bore 79 which preferably extends in a direction longitudinally of the piston axis. The sleeve 80 has its inner end screw-threaded into the bore 79 providing a liquid-seal joint and the outer end of the sleeve 80 is provided with a head in the form of a plug 81 secured in position as by threading and provided with an air vent hole 82 and an inwardly extending projection 83. The interior of the sleeve 80 provides a cylinder in which is positioned a plunger or piston 84 attached to the inner end of a compression spring 85 whose outer end is attached to the inner face of plug 81. The piston 84 is provided with a suitable sealing ring 86 in liquid sealing engagement with the cooperating cylinder wall. A ball check valve is provided within the piston 84 by a ball 87 held against the ball seat by a compression spring 88 and is adapted to be moved away from its seat to open the valve in the manner to be described. Immediately above the ball 87 a hole 89 is provided through the rear face of the piston 84 and this hole is in alignment with the projection 83 and large enough to receive the projection when the piston is moved to its outermost limit, whereupon the valve is opened by unseating the ball and liquid is thereupon allowed to escape through the hole 89 around the projection 83 and outwardly through the vent 82. This construction provides for maintaining a predetermined constant pressure in the liquid reservoir, the piston 84 presenting, in effect, a movable portion of the reservoir wall which performs the dual function of maintaining the liquid under pressure free from any space for air and also permitting for expansion or contraction of the liquid responsive to temperature variations. In the present embodiment I have found a pressure of about five pounds in the liquid reservoir to be satisfactory and accordingly the spring 85 is made of sufficient strength to produce this pressure. As the piston 84 is moved inwardly and outwardly against the liquid, air is permitted to freely escape from the back of the piston outwardly through the vent 82.

With the pressure valve disposed in the position indicated in Fig. 1, the device is adapted for being positioned with the axis of the pressure cylinder disposed upwardly as in vertical position. In order to adapt the compressor unit for use in a horizontal position, the following provision is made. A threaded opening 90 is provided in the reservoir disposed adjacent to the pressure cylinder head and having its axis extending upwardly in a direction transverse thereto. When the device is used in a vertical position this opening is closed by a suitable plug 91 serving to seal the opening; and where the device is desired for use in a horizontal position the pressure valve is interchanged with the plug 91 by screwing the pressure valve case or sleeve 80 into the opening 90 and inserting the plug 91 within the bore or opening 79 to seal the same. The forward pressure chamber 10 is provided with a suitable outlet 92 which is adapted to be placed in liquid communication with the hydraulic mechanism to be actuated, and a compression union 93 is shown for this purpose. The outer end of the piston rod extension 55 carries in threaded engagement therewith an operating rod such as 94 by means of which mechanical motion may be imparted to move the piston mechanism into operating position.

Referring to the diagrammatic illustration of Fig. 5, I have illustrated schematically brake mechanisms such as 95—95' for use in an airplane and provided with suitable hydraulic motors 96—96' for applying the brakes, it being understood that any suitable brake mechanism or hydraulic motor means therefor may be used for this purpose in accordance with such structures well known to those skilled in the art; and the brake means may be either expanding or contracting brakes of the ring type, disc type, or any other suitable form; and the hydraulic motor means may be either the plunger type, diaphragm type or any other suitable mechanism for this purpose. The hydraulic motors 96—96' are connected by suitable hydraulic lines 97—97' with two of the compressor units such as 1—1' which are shown in Fig. 5 as being arranged in the horizontal position with their front ends secured, by means of the eye-screws 6—6', to a suitable part of the airplane designated as 98—98' and with their actuating rods 94—94' extending rearwardly. Suitable mechanism such as the pedals 99—99' are provided for manual actuation of the compressor units. The levers 78—78' for controlling the locking chamber valve are provided with suitable control mechanism such as cables 100—100', supported by suitable means such as pulleys, are preferably connected to a common control handle such as 101.

*Operation*

In describing the operation I will commence with the parts shown in the retracted position (Fig. 1) and the locking chamber valve open (Fig. 2), and with the compressor unit completely filled with liquid, such for example as oil, and with the hydraulic motor and interconnecting line (Fig. 5) also filled, so that the entire system is filled and the liquid is under a predetermined pressure (say 5 lbs.) and engaging the pressure valve piston 84. It is obvious that this pressure valve arrangement will maintain the system free of air pockets, even when the liquid expands and contracts, and even though slight leakage occurs; since these variations will be offset by movement of the said piston 84.

When force is exerted upon the rod 94 the piston 15 moves forward and the liquid now held in high pressure cylinder 14 by valve 38—39 (Fig. 3) causes the low pressure piston 7 to move with the piston 15 thereby displacing a relatively large volume of liquid until slack is taken up in the output end of the system (such as the motors 96 and brakes 95) and a predetermined pressure is reached. During the first part of this joint movement the passages 13 and 32 from the reservoir 3 are closed by the respective seals 8 and 51 but the passage 30 is still open through the passages 29, 28 and valve 21—26 to the rear chamber 11. As soon as the predetermined pressure is reached in the chamber 10 further movement of the rod 94 will cause the liquid in cylinder 14 to exert pressure through the bore 41 (Fig. 3) on the plunger 43 to cause the same to move rearwardly against the compression spring 49 to uncover the passages 42. This simultaneously lifts the head 45 and permits liquid to move beneath the head to hold the same in raised position during the continuance of pressure application. The liquid passing outwardly through the ports 42 goes into the annular space 37 from which it passes inwardly through the holes 36, through the bore 34 and the passage 33 into the rear chamber 11, causing the valve 21—26 to be closed and thereby close the rear chamber. As the smaller piston continues to move inwardly the liquid from the small cylinder is delivered in the large cylinder to the rear of the large piston 7 forcing it forward under relatively high pressure. When the rod 94 is released the retractile springs 12 and 17 return the pistons rearwardly, the liquid passing into the longer cylinder from the reservoir 3 through port 30, annular passage 29 and bleed holes provided behind the ring 8; and into the smaller cylinder through port 30, passages 28, valve 21—26, (Fig. 3) bores 32 and 34, passage 36, space 37 and valve 38—39 (the pressure loaded valve having been now closed by the spring 49). The supplemental port 32 is provided to facilitate bleeding of the system of air when it is first filled and is particularly advantageous when the compressor unit is used in a vertical position. The port 13 serves to bleed the system forward of the large piston 7 equally well in horizontal or vertical position. Once the system is bled of air and the pressure valve piston 84 seated against the liquid under pressure from the spring 85 the system is maintained free of air.

Great difficulty has been experienced in airplane systems in preventing air pockets, and resultant air locks, from taking place due to maneuvers in the air which turn the compressor unit and connected parts upside down and repeatedly change its normal position, also to great differences in air pressure due to variations in altitude. In the system which I have devised all air is excluded from the system and kept out by maintaining the system full of liquid under pressure.

As is customary in airplane operation the respective units 1 and 1' (Fig. 5) may be individually operated to facilitate maneuvering of the airplane while taxiing on the ground. I have provided the locking means; actuated by the levers 78 (Figs. 2 and 5) to provide means for locking the brakes 95—95' in applied position when parking is desired; and to facilitate such operation the levers 78—78' are preferably connected so as to permit operation simultaneously. In accordance with my invention the mechanism is locked in the following manner.

Assuming that the piston rod 19 (Fig. 1) has been moved forward and the desired pressure exerted on the liquid in chamber 10 and the interconnected system, the piston 50 on the rear of the rod 19 has moved forward so as to increase the size of the locking chamber 56 (into which liquid has been permitted free passage through open valve 59—62) now upon movement of the lever 78 (Fig. 2) the cam 73 is rotated until its low side faces the pin 72, thus permitting the spring 63 to move plunger valve 61 against its seat 59, closing the passage from the locking space 56 and trapping liquid therein to lock the mechanism in position with pressure applied.

In such locked position should a substantial temperature increase take place, not only the liquid in the chamber 56 would expand, but the liquid under relatively high pressure in the pressure cylinders, hydraulic motor and interconnecting line. Since such pressure increase might amount to several pounds serious leakage, or other damage might result. To obviate this I have provided the relief valve (Fig. 4) 61—66. At the time that the main lock valve 62—59 is closed there is sufficient space between the valve head 66 and cam 73 to permit the pin 72 to be moved forward: hence upon pressure in chamber 56 increasing above the predetermined value provided by the spring 70 the head 66 is moved from its seat permitting passage of liquid through bore 68 around stem 67 and to the reservoir 3 until the pressure has dropped in locking chamber 56.

Having thus described my invention with particularity with reference to its preferred form, it will be obvious to those skilled in the art, after understanding my invention, that other changes and modifications may be made therein without departing from the spirit and scope of my invention, and I aim in the appended claims to cover such changes and modifications as are within the scope of the invention.

What I claim is:

1. In a liquid compressor the combination of a cylinder having a discharge port for communication with a hydraulic device to be actuated, a piston in said cylinder for discharging liquid through said port, a liquid reservoir in communication with said cylinder, a piston rod for actuating said piston, a locking cylinder rigidly secured to said first cylinder as a longitudinal extension thereof and through which said piston rod passes, a relatively fixed liquid seal between said rod and locking cylinder, a locking piston cooperatively disposed in liquid sealing engagement within said locking cylinder and secured against axial movement relative to said rod and movable with said rod and first piston, said fixed seal and said locking piston jointly providing with said locking cylinder a liquid space, a passage interconnecting said liquid reservoir with said space and a valve for closing said passage to thereby hydraulically lock said first piston in pressure position.

2. In a liquid compressor the combination of a body providing a cylinder having a discharge port for communication with a hydraulic device to be actuated, a piston in said cylinder for discharging liquid through said port, a liquid reservoir in communication with said cylinder, a piston rod for actuating said piston, a locking cylinder rigidly secured to said first cylinder as a longitudinal extension thereof and through which said piston rod passes, a relatively fixed liquid seal between said rod and locking cylinder, a locking piston cooperatively disposed in liquid sealing engagement within said locking cylinder and secured to and movable with said rod and first piston, said fixed seal and said locking piston jointly providing with said locking cylinder a liquid space, a passage provided in said body and interconnecting said liquid reservoir with said space, a valve for closing said passage to thereby hydraulically lock said first piston in pressure position, and a relief valve in communication with said space and constructed and arranged to relieve the pressure in said space in the event said pressure exceeds a predetermined value.

3. In a liquid compressor the combination of a body providing a cylinder having a discharge port for communication with a hydraulic device to be actuated, a piston in said cylinder for discharging liquid through said port, a liquid reservoir in communication with said cylinder, a piston rod for actuating said piston, a locking cylinder rigidly secured to said first cylinder as a longitudinal extension thereof and through which said piston rod passes, a relatively fixed liquid seal between said rod and locking cylinder, a locking piston cooperatively disposed in liquid sealing engagement within said locking cylinder and secured to and movable with said rod and first piston, said fixed seal and said locking piston jointly providing with said locking cylinder a liquid space, a passage provided in said body and interconnecting said liquid reservoir with said space, a valve plunger disposed within said passage for cooperative liquid sealing engagement with a seat formed in said passage, a spring urging said plunger toward said seat, mechanism for holding said plunger in open position, and a relief valve carried by said plunger and constructed and arranged to open at a predetermined pressure in said space to allow liquid to escape from said space through said plunger.

MARTIN V. GROVES.